(No Model.)
A. BALL.
PROSPECTING OR BORING TUBE.
No. 374,817. Patented Dec. 13, 1887.
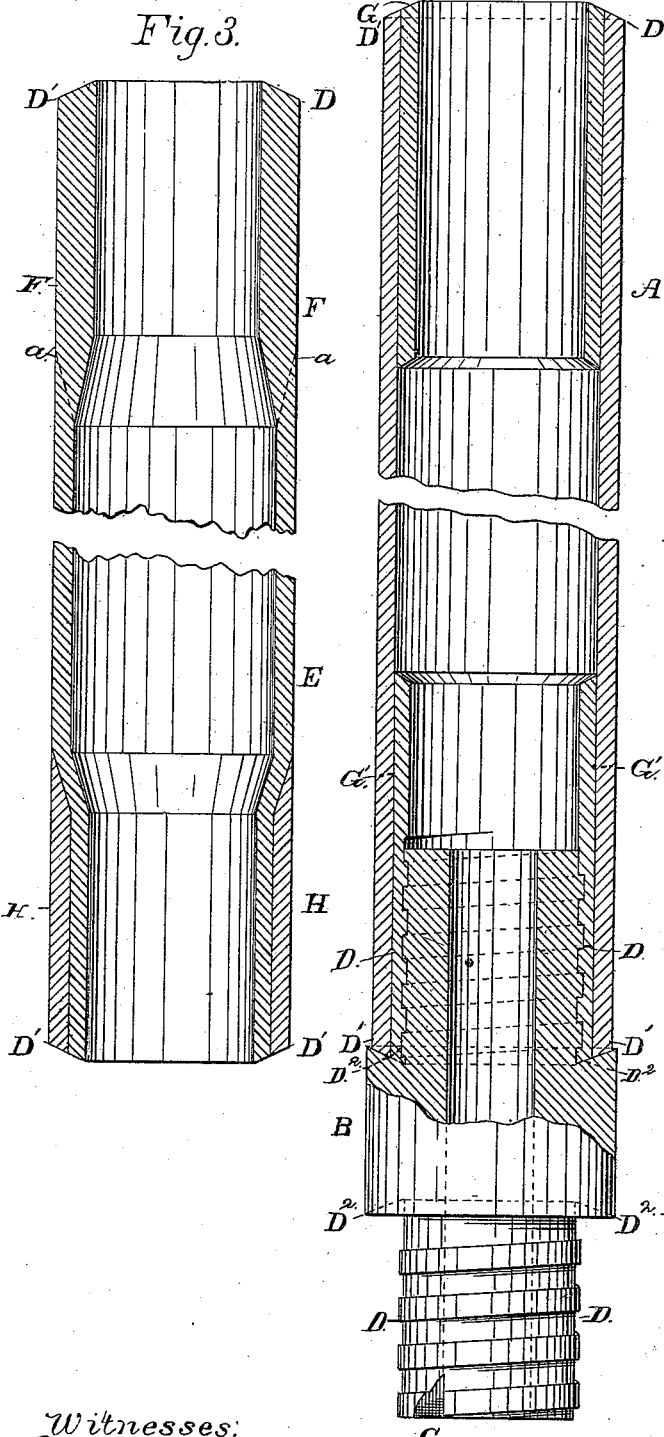
Witnesses:
Geo. H. Cooper Jr.
Jno. C. Schroeder
Inventor:
Albert Ball
per Geo. W. Dyer
Attorney.

UNITED STATES PATENT OFFICE.

ALBERT BALL, OF CLAREMONT, NEW HAMPSHIRE, ASSIGNOR TO THE SULLIVAN MACHINE COMPANY, OF SAME PLACE.

PROSPECTING OR BORING TUBE.

SPECIFICATION forming part of Letters Patent No. 374,817, dated December 13, 1887.

Application filed April 14, 1884. Serial No. 127,909. (No model.)

*To all whom it may concern:*

Be it known that I, ALBERT BALL, of Claremont, in the county of Sullivan and State of New Hampshire, have invented a new and useful Improvement in Prospecting or Boring Tubes; and I do hereby declare that the following is a full and exact description of the same, reference being had to the accompanying drawings and to the letters of reference marked thereon.

The purpose of my improvement is an increased strength in tubes which are employed for prospecting or well-boring or for similar uses at the point where such tubes are weakest—viz., where the couplings are screwed into or upon the ends of each length of tube—and to do so without materially increasing the weight or external size of the tube.

The means which I have devised to accomplish this purpose consist, mainly, in various contrivances for thickening the walls of the tubes at their ends and for beveling such ends and the ends of couplings, all as more fully hereinafter described and claimed.

For the better comprehension of my invention reference should be had to the accompanying drawings, in which—

Figure 1 is a view of a tube, mostly in section, with a portion broken away. Fig. 2 is an end view of a coupling, and Fig. 3 another sectional view of a tube with a portion broken away.

Similar letters denote corresponding parts in each figure.

Ordinarily in the construction of prospecting or boring tubes the same are reduced in size uniformly at one or both ends and screw-threaded upon such reduced ends, or are screw-threaded internally at one or both ends for coupling together with the threaded reduced ends, or similar short couplings are used to connect the larger pieces of tube, the result being a tube of uniform size externally and internally and with meeting joints between the couplings or connections at right angles to the tube lengthwise; and, as before stated, such tubes are weakest and most liable to break or get out of line at the point of coupling.

One of the means for getting strength at this weak point is shown in Fig. 1, where the tube is designated as A, and a piece of tubing, G, is inserted and welded to the main tube, but is shown as not threaded. In the same figure G' exhibits the same internal tube as threaded upon its interior and as receiving the threaded reduced end of the coupling B, which is shown as constructed of an inner tube, D, inserted through a piece of the tube proper and screw-threaded upon its exterior. Another means for thickening the walls of the ends of the tube without increasing its external diameter is shown in Fig. 3 by F, in which instance the tube is upset or driven inwardly, when heated, with proper appliances, and the thickened end thus produced is in condition to be screw-threaded internally; or the same result may be attained by lap-welding a thick short piece of tubing to the main tube, the lap-lines being shown at *a a*. Still another means for thickening the ends of tubes is shown in Fig. 3 at H, which is shown as constructed by placing a ring or piece of tubing over the end of the tube proper and welding the same together, at the same time forging down the ring, so that the uniformity of outline of the tube proper is attained. In each of these methods the ends of the tubes or the meeting shoulders of the couplings are beveled, as shown at D' D' or at $D^2 D^2$, by which means the surfaces of the meeting parts are enlarged and a stronger joint is secured at these points.

It is preferred to cut a notch, C, at the extremity of the reduced threaded ends D D, the edges of which notch closely follow and serve to clean out the walls of the thread in the tube into which these ends are to be screwed.

Having thus described my invention, what I claim as new therein, and wish to protect by Letters Patent, is—

1. A section of a prospecting or boring tube provided with a thickened end or ends and with beveled extremities, substantially as and for the purposes set forth.

2. A section of a prospecting or boring tube provided at one or both ends with a piece of tubing welded to the same and with beveled extremities, substantially as and for the purposes set forth.

3. A section of a prospecting or boring tube provided at one or both ends with an internallyscrew-threaded tube welded to the same and with beveled meeting shoulders, substantially as and for the purposes set forth.

4. A section of a prospecting or boring tube provided at one or both ends with an internally-screw-threaded tube welded to the same and with beveled meeting shoulders, in combination with a coupling-tube having one or both ends reduced and screw-threaded externally and provided with beveled meeting shoulders, substantially as and for the purposes set forth.

5. A section of a prospecting or boring tube provided at one or both ends with an internally-screw-threaded tube welded to the same and with beveled meeting shoulders, in combination with a coupling composed of an inner tube with reduced and externally-screw-threaded ends inserted through a piece of the tube proper having beveled meeting shoulders, substantially as and for the purposes set forth.

6. A coupling for tubes or pipes having externally screw-threaded ends, with a clearing-notch, C, cut in the extremity of the threaded ends, substantially as and for the purpose set forth.

7. In combination with a tube or pipe having internally-screw-threaded ends, a coupling having externally-screw-threaded ends, with a clearing-notch, C, cut in the extremity of the threaded ends, substantially as and for the purposes set forth.

In testimony whereof I affix my signature in presence of two witnesses.

ALBERT BALL.

Witnesses:
  RUSSELL JARVIS,
  JAMES P. UPHAM.